United States Patent
Yan et al.

(10) Patent No.: US 10,970,864 B2
(45) Date of Patent: Apr. 6, 2021

(54) METHOD AND APPARATUS FOR RECOVERING POINT CLOUD DATA

(71) Applicant: Baidu Online Network Technology (Beijing) Co., Ltd., Beijing (CN)

(72) Inventors: Miao Yan, Beijing (CN); Yifei Zhan, Beijing (CN); Wang Zhou, Beijing (CN); Xiong Duan, Beijing (CN); Xianpeng Lang, Beijing (CN); Changjie Ma, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 202 days.

(21) Appl. No.: 16/232,797

(22) Filed: Dec. 26, 2018

(65) Prior Publication Data

US 2019/0206071 A1     Jul. 4, 2019

(30) Foreign Application Priority Data

Dec. 29, 2017    (CN) .......................... 201711480175.7

(51) Int. Cl.
*G06T 7/50*        (2017.01)
*G06K 9/46*        (2006.01)
(Continued)

(52) U.S. Cl.
CPC ............ *G06T 7/50* (2017.01); *G06K 9/00208* (2013.01); *G06K 9/4628* (2013.01);
(Continued)

(58) Field of Classification Search
CPC ... G06T 7/50; G06T 7/70; G06T 2207/20081; G06T 2207/10028; G06T 2207/20084;
(Continued)

(56) References Cited

U.S. PATENT DOCUMENTS 9,984,499 B1*   5/2018   Jurgenson ............. G06T 19/006
2018/0136332 A1*   5/2018   Barfield, Jr. .............. G06T 7/70
(Continued)

OTHER PUBLICATIONS

Lin et al, "Learning Efficient Point Cloud Generation for Dense 3D Object Reconstruction" arxiv.org, Cornell Univesity Library, 201 Olin Library Cornell University Ithaca, NY 14853, Jun. 21, 2017, pp. 10.

(Continued)

*Primary Examiner* — Kevin Ky

(74) *Attorney, Agent, or Firm* — Knobbe Martens Olson & Bear LLP

(57) ABSTRACT

A method for generating a point cloud data recovery model includes: acquiring at least one 2D image associated with a first point cloud data frame; partitioning the first point cloud data frame into at least one point cloud data set based on attributes of objects in the 2D image; and for each point cloud data set: determining a matching image of the first point cloud data frame from the at least one 2D image; determining 3D position data of a pixel point in the matching image based on the first point cloud data frame and at least one second point cloud data frame; and using 2D position data and the 3D position data of corresponding pixel points in the matching image as training input data and output data of a training model to generate a point cloud data recovery model for the object corresponding to the point cloud data set.

16 Claims, 5 Drawing Sheets

(51) Int. Cl.
  *G06K 9/62* (2006.01)
  *G06K 9/00* (2006.01)
  *G06T 7/70* (2017.01)
  *G06N 20/00* (2019.01)
  *G06K 9/72* (2006.01)
  *G06N 3/08* (2006.01)

(52) U.S. Cl.
  CPC ........... *G06K 9/6202* (2013.01); *G06K 9/627* (2013.01); *G06K 9/6256* (2013.01); *G06K 9/6261* (2013.01); *G06K 9/726* (2013.01); *G06N 3/08* (2013.01); *G06N 20/00* (2019.01); *G06T 7/70* (2017.01); *G06T 2207/10028* (2013.01); *G06T 2207/20081* (2013.01); *G06T 2207/20084* (2013.01)

(58) Field of Classification Search
  CPC .......... G06N 3/08; G06N 20/00; G06K 9/726; G06K 9/6256; G06K 9/6261
  See application file for complete search history.

(56) References Cited

U.S. PATENT DOCUMENTS

| | | | |
|---|---|---|---|
| 2018/0247416 A1* | 8/2018 | Ruda | G06T 7/0004 |
| 2019/0156128 A1* | 5/2019 | Zhang | G08G 1/167 |
| 2019/0353477 A1* | 11/2019 | Zheng | G01B 11/2545 |
| 2020/0014947 A1* | 1/2020 | Abe | H04N 19/105 |
| 2020/0014950 A1* | 1/2020 | Abe | H04N 19/119 |
| 2020/0043186 A1* | 2/2020 | Selviah | G06T 7/33 |

OTHER PUBLICATIONS

Zhao et al, "A fully end-to-end deep learning approach for real-time simultaneous 3D reconstruction and material recognition", arxiv.rg, Cornell University Library, 201 Olin Library Cornell University Ithica, NY 14853, Mar. 14, 2017, pp. 8.

Xiang, et al., "ObjectNet3D: A Large Scale Database for 3D Object Recognition," Stanford University, In European Conference on Computer Vision (ECCV), 2016, 16 pages.

* cited by examiner

METHOD AND APPARATUS FOR RECOVERING POINT CLOUD DATA

CROSS-REFERENCE TO RELATED APPLICATIONS

This application claims priority to Chinese Patent Application No. 201711480175.7, filed with the China National Intellectual Property Administration (CNIPA) on Dec. 29, 2017, the content of which is incorporated herein by reference in its entirety.

TECHNICAL FIELD

Embodiments of the present disclosure relate to the field of processing point cloud data, and specifically to a method and apparatus for recovering point cloud data.

BACKGROUND

Point cloud data is widely used in three-dimensional (3D) reconstruction applications in various industries. Point cloud data is a set of point data in the 3D coordinate system describing a 3D scenario. Generally, the point data in the point cloud data represents the outside surface of an object. The space coordinates of each of the sample points on the surface of the object may be acquired according to a principle of laser measuring or photographic surveying, to obtain the set of point data which is referred as the "point cloud data."

However, due to the occlusion or long distance during the acquisition, a hollow may occur in the point cloud data or the point cloud data is too sparse, which is not conductive to extracting and partitioning the target object. Therefore, the recovery for the point cloud data becomes one of the hot issues urgent to be solved.

SUMMARY

According to exemplary embodiments of the present disclosure, a solution for recovering point cloud data is provided.

In a first aspect, the present disclosure provides a method for generating a point cloud data recovery model. The method includes: acquiring at least one two-dimensional (2D) image associated with a first point cloud data frame; partitioning the first point cloud data frame into at least one point cloud data set based on attributes of objects in the 2D image; and for each point cloud data set: determining a matching image of the first point cloud data frame from the at least one 2D image, the matching image matching the first point cloud data frame at at least one of a data acquisition position or data acquisition time; determining three-dimensional (3D) position data of a pixel point in the matching image based on the first point cloud data frame and at least one second point cloud data frame associated with the first point cloud data frame; and using 2D position data and the 3D position data of corresponding pixel points in the matching image as training input data and training output data of a training model, and generating a point cloud data recovery model for an object corresponding to the point cloud data set through a deep learning network.

In a second aspect, the present disclosure provides a method for recovering point cloud data. The method includes: acquiring at least one two-dimensional (2D) image associated with a to-be-recovered point cloud data frame; partitioning the to-be-recovered point cloud data frame into at least one point cloud data set based on attributes of objects in the 2D image; and for each point cloud data set: determining, in the at least one 2D image, a matching image of the to-be-recovered point cloud data frame, the matching image matching the to-be-recovered point cloud data frame at at least one of a data acquisition position or data acquisition time; and recovering respectively point cloud data in the point cloud data set respectively through a point cloud data recovery model for an object corresponding to the point cloud data set, based on 2D position data of a corresponding pixel point in the matching image.

In a third aspect, the present disclosure provides an apparatus for generating a point cloud data recovery model. The apparatus includes: an image acquiring module, configured to acquire at least one two-dimensional (2D) image associated with a first point cloud data frame; a point cloud partitioning module, configured to partition the first point cloud data frame into at least one point cloud data set based on attributes of objects in the 2D image; an image determining module, configured to determine, for each point cloud data set, a matching image of the first point cloud data frame from the at least one 2D image, the matching image matching the first point cloud data frame at at least one of a data acquisition position or data acquisition time; a position determining module, configured to determine, for the each point cloud data set, three-dimensional (3D) position data of a pixel point in the matching image based on the first point cloud data frame and at least one second point cloud data frame associated with the first point cloud data frame; and a model generating module, configured to use, for the each point cloud data set, 2D position data and the 3D position data of corresponding pixel points in the matching image as training input data and training output data of a training model, and generate a point cloud data recovery model for an object corresponding to the point cloud data set through a deep learning network.

In a fourth aspect, the present disclosure provides an apparatus for recovering point cloud data. The apparatus includes: an image acquiring module, configured to acquire at least one two-dimensional (2D) image associated with a to-be-recovered point cloud data frame; a point cloud partitioning module, configured to partition the to-be-recovered point cloud data frame into at least one point cloud data set according to attributes of objects in the 2D image; an image determining module, configured to determine, for each point cloud data set, a matching image of the to-be-recovered point cloud data frame in the at least one 2D image, the matching image matching the to-be-recovered point cloud data frame at at least one of a data acquisition position or data acquisition time; and a point cloud recovering module, configured to recover, for the each point cloud data set, point cloud data in the point cloud data set respectively through a point cloud data recovery model for an object corresponding to the point cloud data set, based on 2D position data of corresponding pixel points in the matching image.

In a fifth aspect, the present disclosure provides a device. The device includes: one or more processors; and a storage device, configured to store one or more programs. The one or more programs, when executed by the one or more processors, cause the one or more processors to implement the method according to the first aspect of the present disclosure.

In a sixth aspect, the present disclosure provides a device. The device includes: one or more processors; and a storage device, configured to store one or more programs. The one or more programs, when executed by the one or more processors, cause the one or more processors to implement the method according to the second aspect of the present disclosure.

In a seventh aspect, the present disclosure provides a computer readable medium storing a computer program. The program, when executed by a processor, implements the method according to the first aspect of the present disclosure.

In an eighth aspect, the present disclosure provides a computer readable medium storing a computer program. The program, when executed by a processor, implements the method according to the second aspect of the present disclosure.

It should be understood that the content of the present disclosure is not intended to limit the essential or important features of the embodiments of the present disclosure, and the scope of the present disclosure. Other features of the present disclosure will be easily understood through the following description.

BRIEF DESCRIPTION OF THE DRAWINGS

The above and other features, advantages, and aspects of the embodiments of the present disclosure will become more apparent in combination with the accompanying drawings and with reference to the following detailed description. In the accompanying drawings, the same or similar reference numerals represent the same or similar elements.

DETAILED DESCRIPTION OF EMBODIMENTS

Figure 1:
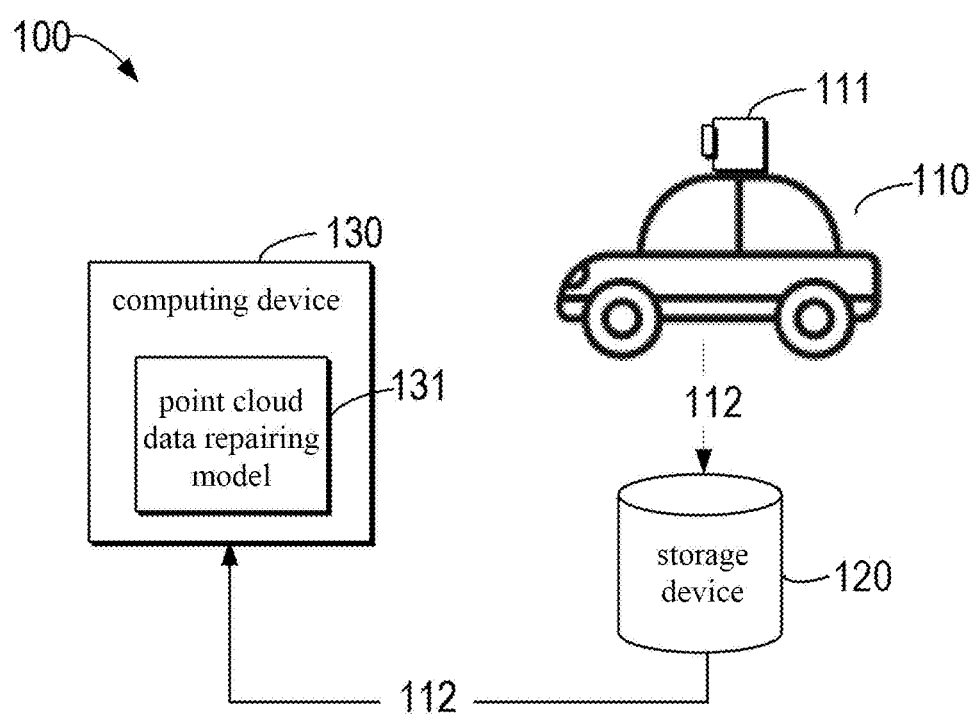
FIG. 1 illustrates a schematic diagram of an exemplary environment in which the embodiments of the present disclosure may be implemented.

The embodiments of the present disclosure will be described in more detail below with reference to the accompanying drawings. Certain embodiments of the present disclosure are shown in the accompanying drawings. However, it should be understood that the present disclosure may be implemented in various forms, and should not be interpreted as being limited by the embodiments described herein. Conversely, the embodiments are provided for a more thorough and complete understanding for the present disclosure. It should be understood that the accompanying drawings and embodiments in the present disclosure are only illustrative, and not used to limit the scope of protection of the present disclosure.

In the description for the embodiments of the present disclosure, the term "including" and similar terms thereof should be understood as open-ended (i.e., "including, but not limited to"). The term "based on" should be understood as "at least partially based on." The term "an embodiment" or "the embodiment" should be understood as "at least one embodiment." The terms "first," "second," and the like may refer to different or identical objects. Other explicit and implicit definitions may also be included hereinafter.

As mentioned above, due to the occlusion or long distance in the acquisition, there may be a hollow in the point cloud data, or the point cloud data may be too sparse, which is not conductive to extracting and partitioning the target objects. In the known traditional solution, the recovery for the point cloud data is usually achieved through the linear interpolation within a certain range that is performed based on the point cloud data itself. In some techniques, based on the relationship between the 2D image and the point cloud data, the 3D positions of pixel points are estimated through a geometrical relationship based on the 2D coordinates of the pixel points in the 2D image. However, in these existing techniques, methods such as fitting or interpolation directly performed on the point cloud data are used, which cannot ensure the accuracy and the universality.

The basic idea of the embodiments of the present disclosure lies in that a point cloud data recovery model is generated by training a deep learning network with the help of massive image data and point cloud data of the same scene, and the point cloud data is recovered using the point cloud data recovery model. The point cloud data is recovered by constructing a model, which ensures the universality of the method. In addition, due to the use of the massive data, the accuracy of recovering the point cloud data is improved. According to the embodiments of the present disclosure, models may be respectively constructed for different object attributes in a given scenario. Accordingly, the recovery is respectively performed on the respective portions of the point cloud data corresponding to the different object attributes. In this way, the accuracy of recovering the point cloud data may further be improved.

As used herein, the term "model" may learn the correlation between the corresponding input and output from the training data, and thus, the corresponding output may be generated for the given input after the training is completed. It should be understood that the "model" may also be referred to as "neural network," "learning model," "learning network" "deep learning network," or the like.

The embodiments of the present disclosure will be specifically described below with reference to the accompanying drawings.

FIG. 1 illustrates a schematic diagram of an exemplary environment 100 in which the embodiments of the present disclosure may be implemented. In the exemplary environment 100, for various scenarios, the acquisition operating vehicle 110 acquires massive scenario data 112 through the data acquisition apparatus 111 provided on the acquisition operating vehicle 110. In the embodiments of the present disclosure, the scenario data 112 may include both of the point cloud data and image data of the given scenario. In the embodiments of the present disclosure, the scenario data 112 may further include the information of at least one of the acquisition position or the acquisition time of the point cloud data and the information of at least one of the acquisition position or the acquisition time of the image data.

As an example, in some embodiments, the data acquisition apparatus 111 may include a sensor system such as a light detection and ranging (LIDAR) system, a stereo camera system, and a mobile laser imaging system, which is used to acquire the point cloud data of a scenario. For example, the point cloud data may include at least one of 3D coordinates (XYZ), a laser reflection intensity, or color information (RGB). In the embodiments of the present disclosure, the data acquisition apparatus 111 may further include an image acquiring unit such as a camera or a video camera, which is used to acquire the image data of the scenario. For example, the image data may include 2D coordinates (XY), or a gray-scale value.

As shown in FIG. 1, after being acquired, the scenario data 112 may be stored into the storage device 120 to be subsequently processed or used by the computing device 130. In the embodiments of the present disclosure, the storage device 120 may be a local storage device of the acquisition operating vehicle 110 or an external storage device that may be accessed by the vehicle 110. In other embodiments, the storage device 120 may be a local storage device of the computing device 130 or an external storage device that may be accessed by the computing device 130.

In the embodiments of the present disclosure, the computing device 130 may construct the point cloud data recovery model 131 based on the scenario data 112. In the embodiments of the present disclosure, the computing device 130 may also recover the point cloud data in the scenario data 112 based on the constructed point cloud data recovery model 131. In other embodiments, the computing device 130 may also reconstruct a 3D scenario based on the recovered point cloud data.

It should be understood that the above environment 100 is merely an example. The embodiments of the present disclosure are not limited to the above application environment, which may be used in any environment of processing or recovering the point cloud data, for example, the filling of the hole in the depth camera, or the detection for elements using a LIDAR in the manufacturing industry. The exemplary implementations of a solution for recovering the point cloud data according to the embodiments of the present disclosure are described in detail below in combination with FIGS. 2-5.

Figure 2:
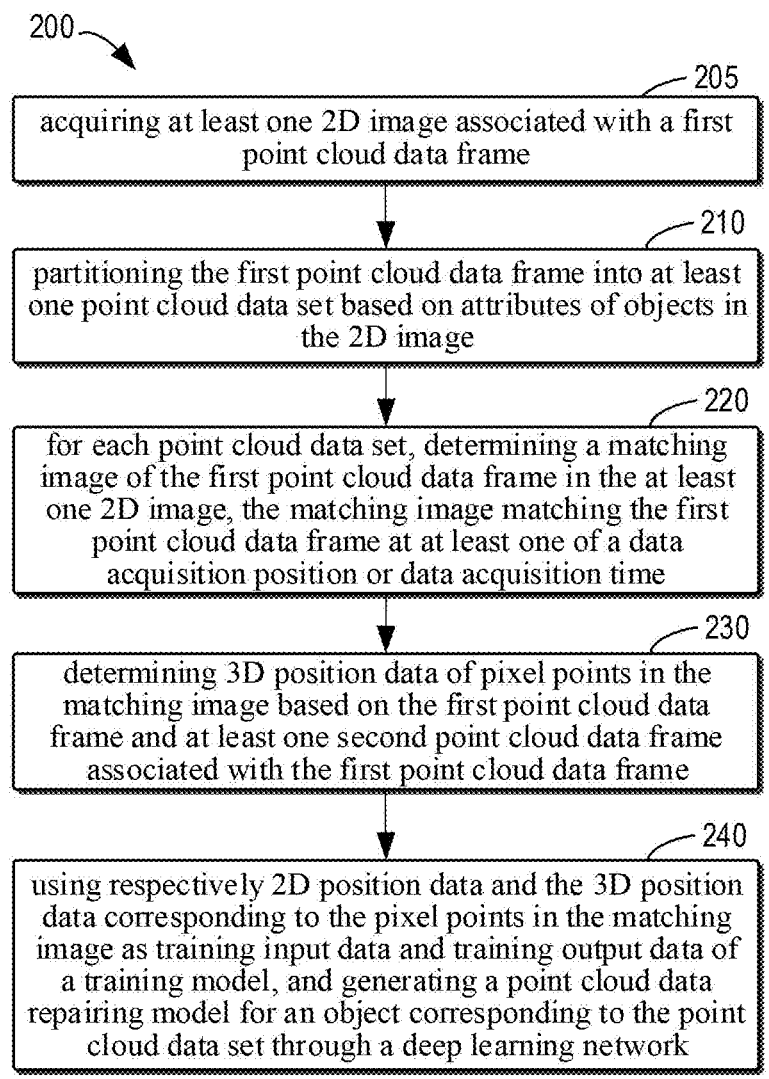
FIG. 2 illustrates a flowchart of a method for generating a point cloud data recovery model according to the embodiments of the present disclosure.

FIG. 2 illustrates a flowchart of a method 200 for generating a point cloud data recovery model according to the embodiments of the present disclosure. The method 200 may be implemented in, for example, the computing device 130 in FIG. 1, to construct the point cloud data recovery model 131. In the embodiments of the present disclosure, the point cloud data is processed frame by frame.

As shown in FIG. 2, at block 205, at least one 2D image associated with a to-be-processed point cloud data frame is acquired. For ease of description, the point cloud data frame may also be referred to as a "first point cloud data frame" herein. As described above, the computing device 130 may acquire, from the scenario data 112, the first point cloud data frame and the image data associated with the point cloud data frame at at least one of the acquisition position or the acquisition time. The exemplary embodiment in this aspect will be described in detail below in combination with the block 310 in FIG. 3.

At block 210, the first point cloud data frame is partitioned into at least one point cloud data set based on the attributes of objects in the at least one 2D image obtained at block 205. According to the embodiments of the present disclosure, the at least one 2D image may be associated with the point cloud data frame at at least one of the data acquisition position or the data acquisition time.

For example, in an embodiment, one or more 2D images may be a set of 2D images acquired at acquisition positions within a predetermined distance from the acquisition position of the point cloud data frame. Alternatively or additionally, in some embodiments, the one or more 2D images may be a set of 2D images acquired in a predetermined time period around the acquisition time of the first point cloud data frame.

According to the embodiments of the present disclosure, the computing device 130 may partition the point cloud data in the first point cloud data frame into one or more point cloud data sets based on the different attributes (e.g., the ground, the building, the animal, and the human) corresponding to the objects in the image, such that respective point cloud data sets correspond to different objects. Thus, values may be assigned to the object attributes of the points in a frame of point cloud data using one or more 2D images.

Figure 3:
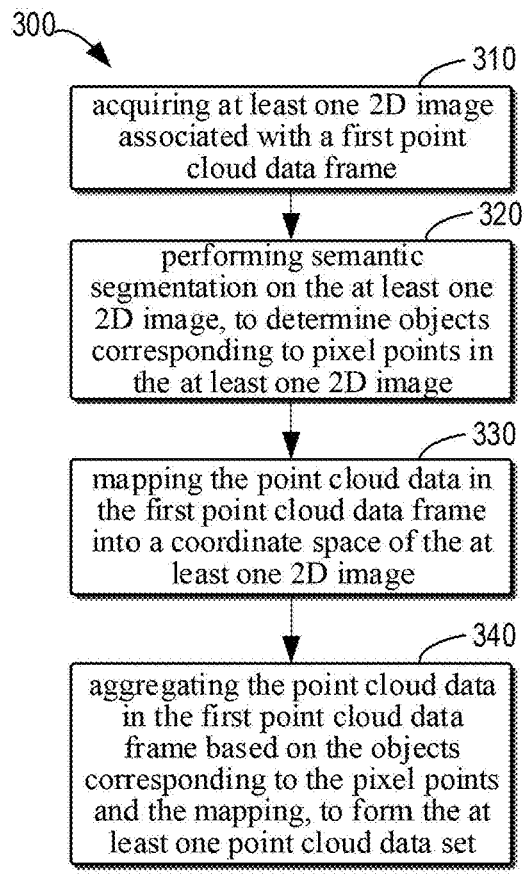
FIG. 3 illustrates a flowchart of a method for partitioning point cloud data according to the embodiments of the present disclosure.

The exemplary implementation of the block 210 is described in more detail below in combination with FIG. 3. FIG. 3 illustrates a flowchart of a method 300 for partitioning point cloud data according to the embodiments of the present disclosure. The method 300 may also be implemented in, for example, the computing device 130 in FIG. 1.

As shown in the drawing, at block 310, the at least one 2D image associated with the first point cloud data frame is acquired. As described above, the computing device 130 may acquire, from the scenario data 112, the first point cloud data frame and the image data associated with the point cloud data frame at at least one of the acquisition position or the acquisition time.

In consideration of an example, for example, the first point cloud data frame currently to be processed is acquired at 10:00 today. Since the image and the point cloud data are acquired simultaneously, through a time stamp, the images, for example, between 9:50 to 10:10 may be selected to be used as the images associated with the first point cloud data frame. In another example, for example, the acquisition position of the first point cloud data frame in the world coordinates is (100, 100, 3). Images at all acquisition positions within, for example, a range of 100 meters from the acquisition position (100, 100, 3) may be selected as the images associated with the first point cloud data frame. It should be understood that the images associated with the first point cloud data frame may be acquired in any proper way known in the art or developed in the future.

At block 320, semantic segmentation is performed on the at least one 2D image to determine the objects corresponding to the pixel points in the at least one 2D image. In the embodiments of the present disclosure, this step may be performed through any proper image semantic segmentation technique known in the art or developed in the future, which will not be repeatedly described here in order to avoid to obscure the idea of the present disclosure. Through the semantic segmentation, the pixel ranges corresponding to respective objects (e.g., the ground, the building, the animal, and the person) in the at least one 2D image may be distinguished from each other, and thus the objects corresponding to the respective pixel points in the at least one 2D image may be determined.

At block 330, the point cloud data in the first point cloud data frame is mapped into the coordinate space of the at least one 2D image. This involves the coordinate conversion from 3D to 2D, and thus, the corresponding relationship between the point cloud data and the pixel points may be acquired. It should be understood that the mapping may be implemented in any proper way known in the art or developed in the future. In one embodiment of the present disclosure, the point cloud data may first be converted to image coordinates and then the image coordinates are converted to the pixel coordinates. In an example, for example, the acquisition operating vehicle 110 acquires the point cloud data through the LIDAR and acquires the image data through the camera. The rotation matrix [R, T] between the LIDAR and the camera is obtained by measuring the relative positional relationship between the LIDAR and the camera. The point cloud data is converted into a coordinate system with the camera as the origin. That is, $$[R,T]*P\_lidar = P\_camera \quad (1).$$

Here, P_lidar is a point in the coordinate system of the LIDAR, and P_camera is a point in the coordinate system of the camera. Then, the point cloud data in the coordinate system with the camera as the origin is mapped to the image coordinates. That is, $$X\_film = fx*X/Z - x\_center, \text{ and } Y\_film = fy*Y/Z - y\_center \quad (2).$$

Here, X_film is the position (pixel level) of the point cloud data in the X direction in the image, fx is the focal length in the X direction, and x_center is the position (pixel level) of the center point in the X direction in the image. Y_film is the position (pixel level) of the point cloud data in the Y direction in the image, fy is the focal length in the Y direction, and y_center is the position (pixel level) of the center point in the Y direction in the image. Then, the image coordinates are converted to the pixel coordinates. Accordingly, the corresponding relationship between the point cloud data and the pixel point may be obtained.

At block 340, the point cloud data in the first point cloud data frame is aggregated based on the objects corresponding to the pixel points and the mapping, to form the at least one point cloud data set. According to the embodiments of the present disclosure, based on the information of the objects corresponding to the respective pixel points determined at block 320 and the corresponding relationship between the points in the point cloud data and the pixel points obtained at block 330, the corresponding object attributes may be assigned to the respective points in the point cloud data. Thus, clustering is performed on the point cloud data based on the object attributes, and the corresponding point cloud data set is formed.

The partitioning on the point cloud data described above in combination with FIG. 3 is for that the recovery can be respectively performed on the corresponding point cloud data based on different object attributes in the subsequent process. By respectively performing the recovery on the partitioned point cloud data based on the partitioning on the point cloud data, the accuracy of recovering the point cloud data may be improved, and the efficiency of recovering the point cloud data may also be improved simultaneously. It should be understood that the method of FIG. 3 is merely an example, and the embodiments of the present disclosure is not limited thereto, other proper ways may also be used to partition the point cloud data to respectively perform recovery on the partitioned point cloud data.

Returning to FIG. 2, at block 220, a matching image of the first point cloud data frame is determined from the at least one 2D image. The matching image matches the first point cloud data frame at at least one of the data acquisition position or the data acquisition time. According to the embodiments of the present disclosure, the computing device 130 may find, from the at least one 2D image, an image consistent or closely consistent with the first point cloud data frame at at least one of the acquisition position or acquisition time to be used as the matching image of the first point cloud data frame.

At block 230, the 3D position data of a pixel point in the matching image is determined based on the first point cloud data frame and at least one reference point cloud data frame associated with the first point cloud data frame. For ease of description, in the specification, the reference point cloud data frame may also be referred to as the "second point cloud data frame."

According to the embodiments of the present disclosure, the computing device 130 may acquire one or more frames before and/or after the first point cloud data frame to be used as the at least one reference point cloud data frame, i.e., the second point cloud data frame. According to the embodiments of the present disclosure, all the pixel points in one image may be restored into the 3D space through a plurality of frames of point cloud data, to obtain a one-to-one corresponding relationship between the pixel points and the point cloud data.

Figure 4:
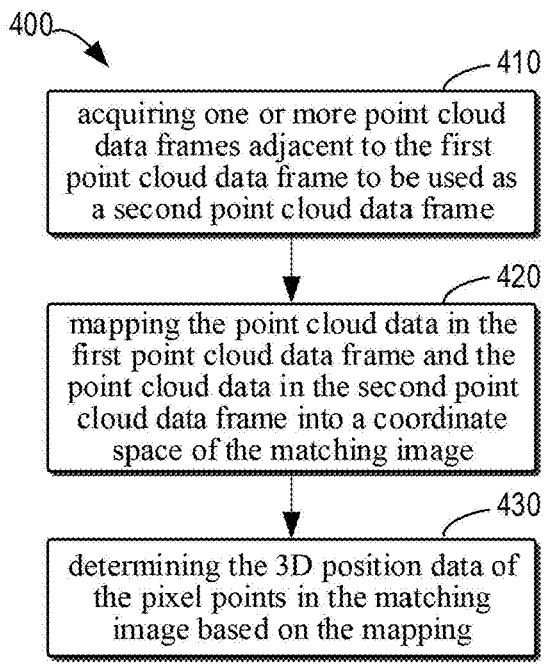
FIG. 4 illustrates a flowchart of a method for determining 3D position data of a pixel point in a matching image according to the embodiments of the present disclosure.

The exemplary implementation of block 230 is described in more detail below in combination with FIG. 4. FIG. 4 illustrates a flowchart of a method 400 for determining the 3D position data of the pixel points in the matching image according to the embodiments of the present disclosure. The method 400 may also be implemented at, for example, the computing device 130 in FIG. 1.

As shown in FIG. 4, at block 410, one or more second point cloud data frames adjacent, to the first point, cloud data frame are acquired. According to the embodiments of the present disclosure, the number of the second point cloud data frames may be determined as needed, so that the point cloud data corresponding to the each of the pixel points in the matching image may be determined from the second point cloud data frames. That is, the 3D position data of the pixel point is determined.

At block 420, the point cloud data in the first point cloud data frame and the point cloud data in the second point cloud data frame are mapped into the coordinate space of the matching image. This step also involves the coordinate conversion from 3D to 2D. Thus, the corresponding relationship between the point cloud data and the pixel points may be obtained. The operation of block 420 may be implemented through the operation similar to that described at block 330, which will not be repeatedly described herein.

At block 430, based on the mapping performed at block 420, the 3D position data of the pixel points in the matching image is determined. According to the embodiments of the present disclosure, the corresponding relationship between the point cloud data and the pixel points may be obtained based on the mapping at block 420. Accordingly, the point cloud data (i.e., the 3D position data) corresponding to all the pixel points in the matching image may be determined.

In the method described. In combination with FIG. 4, the truth-values of the 3D position data of all the pixel points in one matching image may be determined based on a plurality of frames of point cloud data, which is intended to provide corresponding training output data for the subsequent training of the model. It should be understood that the above method of FIG. 4 is merely an example, and not used to limit the embodiments of the present disclosure. In the embodiments of the present disclosure, the truth-values of the 3D position data of the pixel points may be determined in other proper ways to be used as the training output data for the training of the model.

Returning to FIG. 2, at block 240, for each point cloud data set, the 2D position data and the 3D position data of the corresponding pixel points in the matching image are respectively used as the training input data and the training output data. The point cloud data recovery model for the object corresponding to the point cloud data set is generated through a deep learning network.

According to the embodiments of the present disclosure, the computing device 130 may use the point cloud data in a point cloud data set corresponding to a given object and the 2D position data of the pixel point corresponding to the given object in the matching image as an input layer of the deep learning network, and use the 3D position data of the pixel points corresponding to the given object as an output layer of the deep learning network. Thus, the point cloud data recovery model for the object corresponding to the point cloud data set is trained and generated. That is, the point cloud data recovery model is specific to the object in the image, and not just specific to the entire image, which is useful. For example, the point cloud recovery model can be more accurately trained, which makes the model more targeted and the accuracy is enhanced.

According to the embodiments of the present disclosure, the construction of the model may be implemented by any proper deep learning network known in the art or developed in the future, for example, a convolutional neural network, a recurrent neural network, and a deep neural network. At present, the current mainstream deep learning network layers include an input layer, a convolutional layer, a pooling layer (max pooling), a fully connected layer, and an output layer. These layers may be combined according to specific requirements, and initial values are given to each layer. Then, these initial values are modified through the truth-values of the training set, resulting a higher prediction accuracy. The output layer will give the predicted values. In the training mode, the differences between the predicted values and the truth-values will be compared to adjust the values in the network.

According to the embodiments of the present disclosure, corresponding deep learning networks may be trained for the point cloud data corresponding to different objects, to recover the point cloud data corresponding to the objects. Accordingly, the accuracy is higher than that of recovering all the point cloud data using one identical network.

Figure 5:
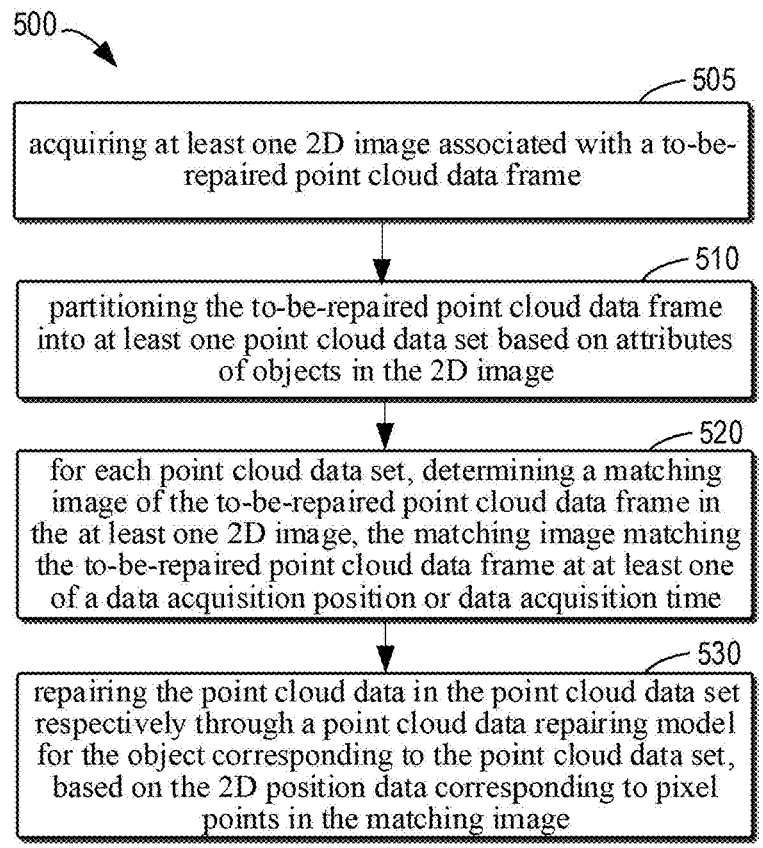
FIG. 5 illustrates a flowchart of a method for recovering the point cloud data according to the embodiments of the present disclosure.

The process of generating the point cloud data recovery model according to the embodiments of the present disclosure has been described in combination with FIGS. 2-4. FIG. 5 below describes a process of using the point cloud data recovery model according to the embodiments of the present disclosure. FIG. 5 illustrates a flowchart of a method 500 for recovering point cloud data according to the embodiments of the present disclosure. The method 500 may be implemented at, for example, the computing device 130 in FIG. 1. It will be appreciated that the method 200 described above may be regarded as a process of training the point cloud data recovery model, while the method 500, which will be described below, is a process of using the model.

As shown in FIG. 5, at block 505, at least one 2D image associated with a to-be-recovered point cloud data frame is obtained. The processing in this step is similar to the processing at block 205, and reference for other details may be made to the descriptions given in combination with block 205.

At block 510, the to-be-recovered point cloud data frame is partitioned into at least one point cloud data set based on the attributes of the objects in the at least one 2D image obtained at block 505. According to the embodiments of the present disclosure, the computing device 130 may acquire one or more 2D images associated with the to-be-recovered point cloud data frame at at least one of the acquisition position or the acquisition time, and partition the point cloud data frame into the at least one point cloud data set based on the attributes of the objects in the 2D image corresponding to the point data in the to-be-recovered point cloud data frame, which facilitates the recovery respectively performed on the different object attributes in the subsequent process. The processing in this step is similar to the processing at block 210, and reference for other details may be made to the descriptions given in combination with block 210.

At block 520, a matching image of the to-be-recovered point cloud data frame is determined from the at least one 2D image, and the matching image matches the to-be-recovered point cloud data frame at at least one of the data acquisition position or the data acquisition time. According to the embodiments of the present disclosure, the computing device 130 may find, from the at least one 2D image, an image consistent or closely consistent with the point cloud data frame at at least one of the acquisition position or the acquisition time to be used as the matching image of the point cloud data frame. The processing in this step is similar to the processing at 220.

At block 530, for each point cloud data set in the at least one point cloud data set, based on 2D position data of corresponding pixel points in the matching image, the point cloud data in the point cloud data set is recovered respectively through a point cloud data recovery model for the object corresponding to the point cloud data set. Similar to the training input, data at the time of establishing the model, in the embodiments of the present disclosure, the point cloud data in the point cloud data set corresponding to the a given object attribute and the 2D position data of the pixel point corresponding to the given object attribute in the matching image are used as the input data of the point cloud data recovery model. Correspondingly, the output data of the point cloud data recovery model is the recovered point cloud data corresponding to the given object attribute (i.e., the 3D position data of all the pixel points corresponding to the given object attribute in the matching image). The so-called recovery may refer to the filling of the point data in the point cloud data.

According to the embodiments of the present disclosure, the recovery of the point cloud data is realized by constructing a model using massive data, which ensures the accuracy and universality of the method. In addition, in the embodiments of the present disclosure, for the point cloud data corresponding to different objects, the point cloud data of a corresponding object may be recovered through a pre-trained point cloud data recovery model of the corresponding object. As compared with the process of recovering all the point cloud data using one identical model, the accuracy is higher.

Figure 6:
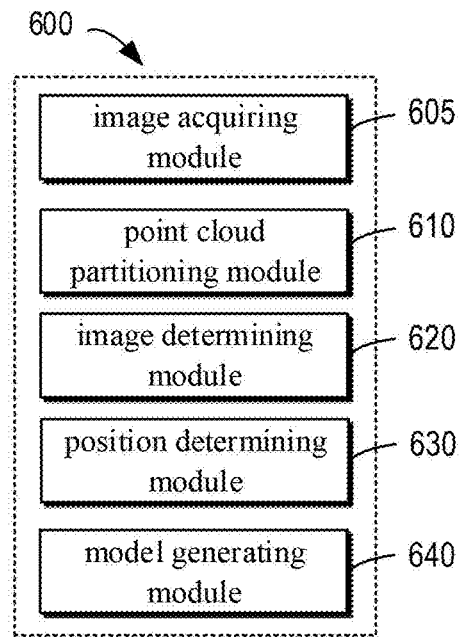
FIG. 6 illustrates a schematic block diagram of an apparatus for generating a point cloud data recovery model according to the embodiments of the present disclosure.

The embodiments of the present disclosure further provide a corresponding apparatus for implementing the above methods or processes. FIG. 6 illustrates a schematic block diagram of an apparatus 600 for generating a point cloud data recovery model according to the embodiments of the present disclosure. The apparatus 600 may be implemented at, for example, the computing device 130 in FIG. 1. As shown in FIG. 6, the apparatus 600 may include an image acquiring module 605, a point cloud partitioning module 610, an image determining module 620, a position determining module 630, and a model generating module 640.

According to the embodiments of the present disclosure, the image acquiring module 605 may be configured to acquire at least one 2D image associated with the first point cloud data frame. The operation of the image acquiring module 605 is similar to that at block 205 in FIG. 2, the details of which will not be repeatedly described.

According to the embodiments of the present disclosure, the point cloud partitioning module 610 may be configured to partition the first point cloud data frame into at least one point cloud data set based on attributes of objects in the 2D image. The operation of the point cloud partitioning module 640 is similar to that at block 210 in FIG. 2, the details of which will not be repeatedly described.

In the embodiments of the present disclosure, the point cloud partitioning module 610 may include: a semantic segmentation unit (not shown), configured to perform semantic segmentation on the at least one 2D image to determine an object corresponding to a pixel point in the at least one 2D image; a first mapping unit (not shown), configured to map the point cloud data in the first point cloud data frame into the coordinate space of the at least one 2D image; and a data aggregating unit (not shown), configured to aggregate the point cloud data in the first point cloud data frame based on the objects corresponding to the pixel points and the mapping, to form the at least one point cloud data set. The operations of these units are similar to that described above with reference to FIG. 3, the details of which will not be repeatedly described.

According to the embodiments of the present disclosure, the image determining module 620 may be configured to determine a matching image from the at least one 2D image, the matching image matching the first point cloud data frame at at least one of a data acquisition position or data acquisition time. The operation of the image determining module 620 is similar to that at block 220 in FIG. 2, the details of which will not be repeatedly described.

According to the embodiments of the present disclosure, the position determining module 630 may be configured to determine 3D position data of a pixel point in the matching image according to the first point cloud data frame and at least one reference point cloud data frame (also referred to as "second point cloud data frame" herein) associated with the first point cloud data frame. The operation of the position determining module 630 is similar to that at block 230 in FIG. 2, the details of which will not be repeatedly described.

In the embodiments of the present disclosure, the position determining module 630 may include: a data acquiring unit (not shown), configured to acquire one or more point cloud data frames adjacent to the first point cloud data frame to be used as the at least one reference point cloud data frame; a second mapping unit (not shown), configured to map the point cloud data in the first point cloud data frame and the point cloud data in the second point cloud data frame into the coordinate space of the matching image; and a position determining unit (not shown), configured to determine the 3D position data of the pixel points in the matching image based on the mapping. The operations of these units are similar to that described above with reference to FIG. 4, the details of which will not be repeatedly described.

According to the embodiments of the present disclosure, for each point cloud data set, the model generating module 640 may be configured to respectively use the 2D position data and the 3D position data of corresponding pixel points in the matching image as training input data and training output data, and generate a point cloud data recovery model for the object corresponding to the point cloud data set through the deep learning network. The operation of the model generating module 640 is similar to that at the block 240 in FIG. 2, the details of which will not be repeatedly described.

Figure 7:
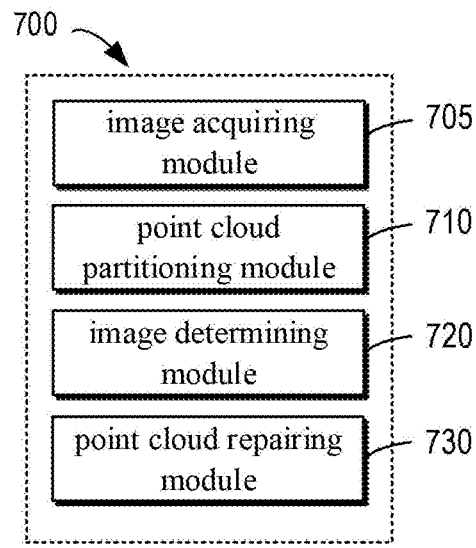
FIG. 7 illustrates a schematic block diagram of an apparatus for recovering point cloud data according to the embodiments of the present disclosure.

FIG. 7 illustrates a schematic block diagram of an apparatus 700 for recovering point cloud data according to the embodiments of the present disclosure. The apparatus 700 may also be implemented at, for example, the computing device 130 in FIG. 1. As shown in FIG. 7, the apparatus 700 may include an image acquiring module 705, a point cloud partitioning module 710, an image determining module 720, and a point cloud recovering module 730.

According to the embodiments of the present disclosure, the image acquiring module 705 may be configured to acquire at least one 2D image associated with a to-be-recovered point cloud data frame. The operation of the image acquiring module 705 is similar to that at block 505 in FIG. 5, the details of which will not be repeatedly described.

According to the embodiments of the present disclosure, the point cloud partitioning module 710 may be configured to partition the to-be-recovered point cloud data frame into at least one point cloud data set based on the attributes of the objects in the 2D image. The operation of the point cloud partitioning module 710 is similar to that at block 510 in FIG. 5, the details of which will not be repeatedly described.

In the embodiments of the present disclosure, the point cloud partitioning module 710 may include: a semantic segmentation unit (not shown), configured to perform semantic segmentation on the at least one 2D image to determine the object corresponding to a pixel point in the at least one 2D image; a first mapping unit (not shown), configured to map the point cloud data in the to-be-recovered point cloud data frame into the coordinate space of the at least one 2D image; and a data aggregating unit (not shown), configured to aggregate the point cloud data in the to-be-recovered point cloud data frame based on the objects corresponding to the pixel points and the mapping, to form the at least one point cloud data set. The operations of these units are similar to that described in combination with FIG. 3, the details of which will not be repeatedly described.

According to the embodiments of the present disclosure, the image determining module 720 may be configured to determine a matching image from the at least one 2D image, the matching image matching the to-be-recovered point cloud data frame at at least one of a data acquisition position or data acquisition time. The operation of the image determining module 720 is similar to that at block 520 in FIG. 5, the details of which will not be repeatedly described.

According to the embodiments of the present disclosure, for the each point cloud data set, the point cloud recovering module 730 may be configured to respectively recover the point cloud data in the point cloud data set through the point cloud data recovery model for the object corresponding to the point cloud data set, based on the 2D position data of corresponding pixel points in the matching image. The operation of the point cloud recovering module 730 is similar to that at block 530 in FIG. 5, the details of which will not be repeatedly described.

It should be understood that the units recited in the apparatus 600 and the apparatus 700 respectively correspond to the steps in the method 200 and the method 500 described with reference to FIGS. 2 and 5. In addition, the operations and the features of the units included in the apparatus 600 and the apparatus 700 and the operations and the features of the apparatus 600 and the apparatus 700 correspond to and have the same effects as the operations and features described above in combination with FIGS. 2-5, the details of which will not be repeatedly described.

The units included in the apparatus 600 and the apparatus 700 may be implemented by various means, including software, hardware, firmware, or any combination thereof. In one embodiment, one or more units may be implemented using the software and/or the firmware, for example, a machine executable instruction stored on a storage medium. In addition to or as a substitute for the machine executable instruction, some or all of the units in the apparatus 600 and the apparatus 700 may be at least partially implemented by one or more hardware logic components. As an example rather than a limitation, exemplary hardware logic components that may be used include a field programmable gate array (FPGA), an application specific integrated circuit (ASIC), an application specific standard product (ASSP), a system on chip (SOC), a complex programmable logic device (CPLD), and so on.

The units shown in FIGS. 6 and 7 may be implemented as hardware modules, software modules, firmware modules, or any combination thereof in part or in whole. In particular, in some embodiments, the processes, methods, or procedures described above may be implemented by a storage system, the host machine corresponding to the storage system, or the hardware in other computing devices independent of the storage system.

Figure 8:
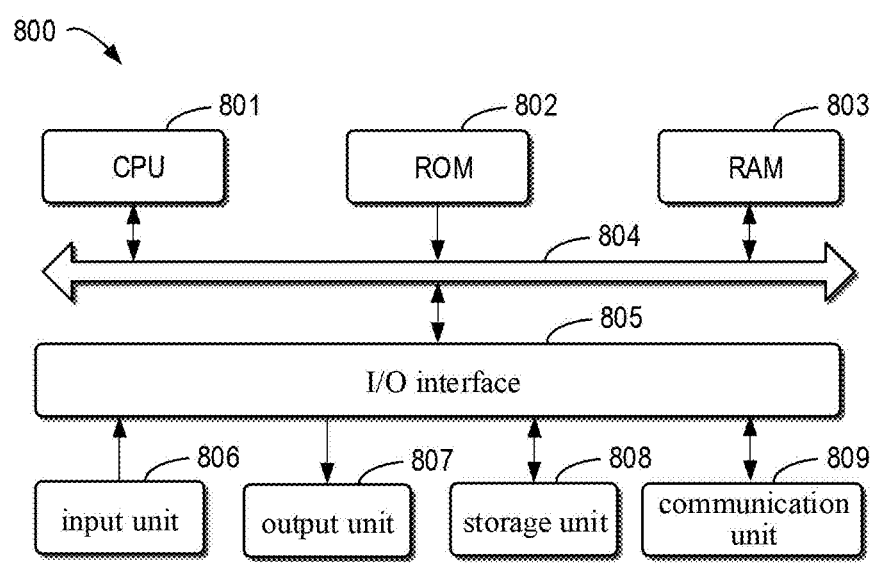
FIG. 8 illustrates a block diagram of a computer device which may implement the embodiments of the present disclosure.

FIG. 8 shows a schematic block diagram of an exemplary device 800 capable of implementing various embodiments of the present disclosure. The device 800 may be used to implement the device 130 in FIG. 1. As shown in the figure, the device 800 includes a central processing unit (CPU) 801 that may perform various appropriate actions and processing in accordance with computer program instructions stored in a read only memory (ROM) 802 or computer program instructions loaded into a random access memory (RAM) 803 from a storage unit 808. In the RAM 803, various programs and data required for the operation of the device 800 may also be stored. The CPU 801, the ROM 802, and the RAM 803 are connected to each other through a bus 804. An input/output (I/O) interface 805 is also coupled to the bus 804.

A plurality of components in the device 800 are coupled to the I/O interface 805, including: an input unit 806, such as a keyboard or a mouse; an output unit 807, such as various types of displays, or speakers; the storage unit 808, such as a disk or an optical disk; and a communication unit 809 such as a network card, a modem, or a wireless communication transceiver. The communication unit 809 allows the device 800 to exchange information/data with other devices over a computer network such as the Internet and/or various telecommunication networks.

The processing unit 801 performs the various methods and processes described above, such as the method 200 and/or the method 500. For example, in some embodiments, the method 200 and/or the method 500 may be implemented as a computer software program that is tangibly embodied in a machine readable medium, such as the storage unit 808. In some embodiments, some or all of the computer programs may be loaded and/or installed onto the device 800 via the ROM 802 and/or the communication unit 809. When a computer program is loaded into the RAM 803 and executed by the CPU 801, one or more of the actions or steps of the method 200 and/or the method 500 described above may be performed. Alternatively, in other embodiments, the CPU 801 may be configured to perform the method. 200 and/or the method 500 by any other suitable means (e.g., by means of firmware).

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions are described in a specific order, this should not be understood that such actions are required to be performed in the specific order shown or in sequential order, or all illustrated actions should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, toe specific features and actions described above are merely exemplary forms of implementing the claims.

What is claimed is:

1. A method for generating a point cloud data recovery model, comprising:
acquiring at least one two-dimensional (2D) image associated with a first point cloud data frame;
partitioning the first point cloud data frame into at least one point cloud data set based on attributes of objects in the 2D image; and
for each point cloud data set,
determining, in the at least one 2D image, a matching image of the first point cloud data frame, the matching image matching the first point cloud data frame at at least one of a data acquisition position or data acquisition time;

determining three-dimensional (3D) position data of a pixel point in the matching image based on the first point cloud data frame and at least one second point cloud data frame associated with the first point cloud data frame; and using 2D position data and the 3D position data of corresponding pixel points in the matching image as training input data and training output data of a training model, and generating a point cloud data recovery model for an object corresponding to the point cloud data set through a deep learning network.

2. The method according to claim 1, wherein the partitioning comprises:

performing semantic segmentation on the at least one 2D image, to determine objects corresponding to pixel points in the at least one 2D image;

mapping point cloud data in the first point cloud data frame into a coordinate space of the at least one 2D image; and aggregating the point cloud data in the first point cloud data frame based on the objects corresponding to the pixel points and the mapping, to form the at least one point cloud data set.

3. The method according to claim 1, wherein the at least one 2D image is associated with the first point cloud data frame at at least one of the data acquisition position or the data acquisition time.

4. The method according to claim 1, wherein the determining three-dimensional (3D) position data of a pixel point in the matching image comprises:

acquiring one or more point cloud data frames adjacent to the first point cloud data frame to be used as the at least one second point cloud data frame;

mapping the point cloud data in the first point cloud data frame and point cloud data in the second point cloud data frame into a coordinate space of the matching image; and determining the 3D position data of the pixel point in the matching image based on the mapping.

5. A method for recovering point cloud data by using the point cloud data recovery model generated according to claim 1, comprising:

acquiring at least one two-dimensional (2D) image associated with a to-be-recovered point cloud data frame;

partitioning the to-be-recovered point cloud data frame into at least one point cloud data set based on attributes of objects in the 2D image; and for each point cloud data set,
determining, in the at least one 2D image, a matching image of the to-be-recovered point cloud data frame, the matching image matching the to-be-recovered point cloud data frame at at least one of a data acquisition position or data acquisition time; and recovering respectively point cloud data in the point cloud data set respectively through the point cloud data recovery model for an object corresponding to the point cloud data set, based on 2D position data of a corresponding pixel point in the matching image.

6. The method according to claim 5, wherein the partitioning comprises:

performing semantic segmentation on the at least one 2D image, to determine objects corresponding to pixel points in the at least one 2D image;

mapping point cloud data in the to-be-recovered point cloud data frame into a coordinate space of the at least one 2D image; and aggregating the point cloud data in the to-be-recovered point cloud data frame based on the objects corresponding to the pixel points and the mapping, to form the at least one point cloud data set.

7. The method according to claim 5, wherein the at least one 2D image is associated with the to-be-recovered point cloud data frame at at least one of the data acquisition position or the data acquisition time.

8. An apparatus for recovering point cloud data, comprising:

at least one processor; and a memory storing instructions, the instructions when executed by the at least one processor, cause the at least one processor to perform operations according to claim 5.

9. The apparatus according to claim 8, wherein the partitioning comprises:

performing semantic segmentation on the at least one 2D image to determine objects corresponding to pixel points in the at least one 2D image;

mapping point cloud data in the to-be-recovered point cloud data frame into a coordinate space of the at least one 2D image; and aggregating the point cloud data in the to-be-recovered point cloud data frame based on the objects corresponding to the pixel points and the mapping, to form the at least one point cloud data set.

10. The apparatus according to claim 8, wherein the at least one 2D image is associated with the to-be-recovered point cloud data frame at at least one of the data acquisition position or the data acquisition time.

11. A computer non-transitory readable storage medium storing a computer program, wherein the program, when executed by a processor, cause the processor to implement the method according to claim 5.

12. A computer non-transitory readable storage medium storing a computer program, wherein the program, when executed by a processor, cause the processor to implement the method according to claim 1.

13. An apparatus for generating a point cloud data recovery model, comprising:

at least one processor; and a memory storing instructions, the instructions when executed by the at least one processor, cause the at least one processor to perform operations, the operations comprising:

acquiring at least one two-dimensional (2D) image associated with a first point cloud data frame;

partitioning the first point cloud data frame into at least one point cloud data set based on attributes of objects in the 2D image;

determining, for each point cloud data set, a matching image of the first point cloud data frame from the at least one 2D image, the matching image matching the first point cloud data frame at at least one of a data acquisition position or data acquisition time;

determining, for the each point cloud data set, three-dimensional (3D) position data of a pixel point in the matching image based on the first point cloud data frame and at least one second point cloud data frame associated with the first point cloud data frame; and using, for the each point cloud data set, 2D position data and the 3D position data of corresponding pixel points in the matching image as training input data and training output data of a training model, and generating a point cloud data recovery model for an object corresponding to the point cloud data set through a deep learning network.

14. The apparatus according to claim 13, wherein the partitioning comprises:
performing semantic segmentation on the at least one 2D image, to determine objects corresponding to pixel points in the at least one 2D image;
mapping point cloud data in the first point cloud data frame into a coordinate space of the at least one 2D image; and
aggregating the point cloud data in the first point cloud data frame based on the objects corresponding to the pixel points and the mapping, to form the at least one point cloud data set.

15. The apparatus according to claim 13, wherein the at least one 2D image is associated with the first point cloud data frame at at least one of the data acquisition position or the data acquisition time.

16. The apparatus according to claim 13, wherein determining three-dimensional (3D) position data of a pixel point in the matching image comprises:
acquiring one or more point cloud data frames adjacent to the first point cloud data frame to be used as the at least one second point cloud data frame;
mapping the point cloud data in the first point cloud data frame and point cloud data in the second point cloud data frame into a coordinate space of the matching image; and
determining the 3D position data of the pixel point in the matching image based on the mapping.

\* \* \* \* \*